US011472043B2

(12) United States Patent
Hongo et al.

(10) Patent No.: US 11,472,043 B2
(45) Date of Patent: Oct. 18, 2022

(54) LINK MECHANISM

(71) Applicant: SONY CORPORATION, Tokyo (JP)

(72) Inventors: Kazuo Hongo, Tokyo (JP); Hiromasa Masuda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 45 days.

(21) Appl. No.: 17/052,064

(22) PCT Filed: Feb. 13, 2019

(86) PCT No.: PCT/JP2019/004927
§ 371 (c)(1),
(2) Date: Oct. 30, 2020

(87) PCT Pub. No.: WO2019/220709
PCT Pub. Date: Nov. 21, 2019

(65) Prior Publication Data
US 2021/0138665 A1 May 13, 2021

(30) Foreign Application Priority Data

May 14, 2018 (JP) .............................. JP2018-092940

(51) Int. Cl.
*B25J 15/08* (2006.01)
*B25J 9/10* (2006.01)
*F16H 21/10* (2006.01)

(52) U.S. Cl.
CPC .............. *B25J 15/08* (2013.01); *B25J 9/106* (2013.01); *F16H 21/10* (2013.01)

(58) Field of Classification Search
CPC . B25J 9/1065; B25J 15/08; B25J 9/107; B25J 9/106; F16H 21/10
See application file for complete search history.

(56) References Cited

U.S. PATENT DOCUMENTS

| 2001/0004852 A1* | 6/2001 | Mitsuyoshi | B25J 9/1065 74/490.01 |
| 2005/0092121 A1* | 5/2005 | Huang | B25J 9/1065 74/490.01 |

(Continued)

FOREIGN PATENT DOCUMENTS

| CN | 103917338 A | 7/2014 |
| EP | 2777895 A1 | 9/2014 |

(Continued)

OTHER PUBLICATIONS

International Search Report and Written Opinion of PCT Application No. PCT/JP2019/004927, dated May 21, 2019, 08 pages of ISRWO.

*Primary Examiner* — Terence Boes
(74) *Attorney, Agent, or Firm* — Chip Law Group

(57) ABSTRACT

[Problem] Provided is a link mechanism capable of moving a tip end part substantially straight by using a simpler structure. [Solution] A link mechanism including a first parallel link mechanism having a fixed link and an intermediate link parallel to each other, and a pair of side links parallel to each other, a second parallel link mechanism having a fixed link and an intermediate link parallel to each other, and a pair of side links parallel to each other, in which the fixed link is connected to the intermediate link of the first parallel link mechanism, a fixed structure that is formed including the intermediate link of the first parallel link mechanism and the fixed link of the second parallel link mechanism, and a coupling link that couples one of the side links of the first parallel link mechanism and one of the side links of the second parallel link mechanism.

15 Claims, 12 Drawing Sheets

(56) References Cited

U.S. PATENT DOCUMENTS

| | | | | |
|---|---|---|---|---|
| 2010/0181792 | A1* | 7/2010 | Birglen | B25J 15/08 901/39 |
| 2013/0192406 | A1* | 8/2013 | Godowski | B25J 9/106 901/1 |
| 2014/0232124 | A1* | 8/2014 | Dan | B25J 15/086 294/198 |
| 2019/0176344 | A1* | 6/2019 | Zheng | B25J 15/022 |
| 2020/0138530 | A1* | 5/2020 | Nowatschin | B25J 19/0004 |
| 2021/0347039 | A1* | 11/2021 | Paine | B25J 9/1005 |
| 2021/0369478 | A1* | 12/2021 | Campeau-Lecours | B43L 15/00 |

FOREIGN PATENT DOCUMENTS

| | | |
|---|---|---|
| EP | 3248737 A1 | 11/2017 |
| JP | 2007-091387 A | 4/2007 |
| JP | 2016-068192 A | 5/2016 |
| KR | 10-2014-0066246 A | 5/2014 |
| WO | 2010/007795 A1 | 1/2010 |
| WO | 2013/069118 A1 | 5/2013 |

\* cited by examiner

LINK MECHANISM

CROSS REFERENCE TO RELATED APPLICATIONS

This application is a U.S. National Phase of International Patent Application No. PCT/JP2019/004927 filed on Feb. 13, 2019, which claims priority benefit of Japanese Patent Application No. JP 2018-092940 filed in the Japan Patent Office on May 14, 2018. Each of the above-referenced applications is hereby incorporated herein by reference in its entirety.

FIELD

The present disclosure relates to a link mechanism.

BACKGROUND

In recent years, mechanical devices (so-called robot devices) that make motions that resemble human motions by using electrical or magnetic action have become widespread. A robot device can make a motion that resembles a human motion by using a link mechanism formed by a plurality of links and joints.

For example, in the industrial field, industrial robot devices such as manipulators or delivery robots that automate production work are widely used. Furthermore, in the field of daily life, life-based support robot devices that support daily motions of users are used.

Such robot devices generally include a gripper mechanism for gripping an object. The gripper mechanism includes a plurality of finger mechanisms that operates such that a fingertip part of each of the finger mechanisms comes into contact with or separates from each other, and the gripper mechanism can grip the object by reducing mutual spacing between the fingertip parts.

For example, a simple rotary type finger mechanism includes a pair of oscillation links of which one end is oscillatably fixed to a base and another end forms a fingertip part. The simple rotary type finger mechanism can change mutual spacing between the fingertip parts by oscillating the pair of oscillation links by using a motor.

However, because the pair of oscillation links in the simple rotary type finger mechanism oscillate with the one end fixed to the base as a rotation center, a depth from the fingertip part to the base changes along with the oscillation. Therefore, in a case where an object placed on a floor or wall is gripped by using a gripper mechanism including a simple rotary type finger mechanism, there is a possibility that the fingertip part may crash into the floor or wall at a time of the gripping.

Therefore, a gripper mechanism has been devised that includes a finger mechanism in which a depth from a fingertip part to a base does not change at a time of gripping. For example, Patent Literature 1 described below discloses a robot hand including a finger mechanism formed by a Chebyshev link mechanism. Because the robot hand disclosed in Patent Literature 1 can move a fingertip part substantially straight at a time of gripping, the robot hand can grip an object without changing a depth from the fingertip part to a base.

CITATION LIST

Patent Literature

Patent Literature 1: WO 2010/007795 A

SUMMARY

Technical Problem

However, the robot hand disclosed in Patent Literature 1 has a large number of parts because the robot hand adopts the Chebyshev link mechanism. Therefore, it has been difficult for the robot hand disclosed in Patent Literature 1 to achieve sufficient strength and reliability. Therefore, there has been a demand for a link mechanism capable of moving a tip end part substantially straight by using a simpler structure.

Solution to Problem

According to the present disclosure, a link mechanism is provided. The link mechanism includes a first parallel link mechanism having a fixed link and an intermediate link parallel to each other, and a pair of side links parallel to each other, a second parallel link mechanism having a fixed link and an intermediate link parallel to each other, and a pair of side links parallel to each other, in which the fixed link is connected to the intermediate link of the first parallel link mechanism, a fixed structure that is formed including the intermediate link of the first parallel link mechanism and the fixed link of the second parallel link mechanism and a coupling link that couples one of the side links of the first parallel link mechanism and one of the side links of the second parallel link mechanism.

According to the present disclosure, it is possible to oscillate a second parallel link mechanism along with oscillation of a first parallel link mechanism by a coupling link, and therefore to draw an intermediate link of the second parallel link mechanism to a base side to which a link mechanism is fixed.

Advantageous Effects of Invention

As described above, according to the present disclosure, it is possible to provide a link mechanism capable of moving a tip end part substantially straight by using a simpler structure.

Note that the above effects are not necessarily limited, and, along with or instead of the above effects, any of the effects described in the present specification or other effects which can be understood from the present specification may be exhibited.

DESCRIPTION OF EMBODIMENTS

Figure 1:
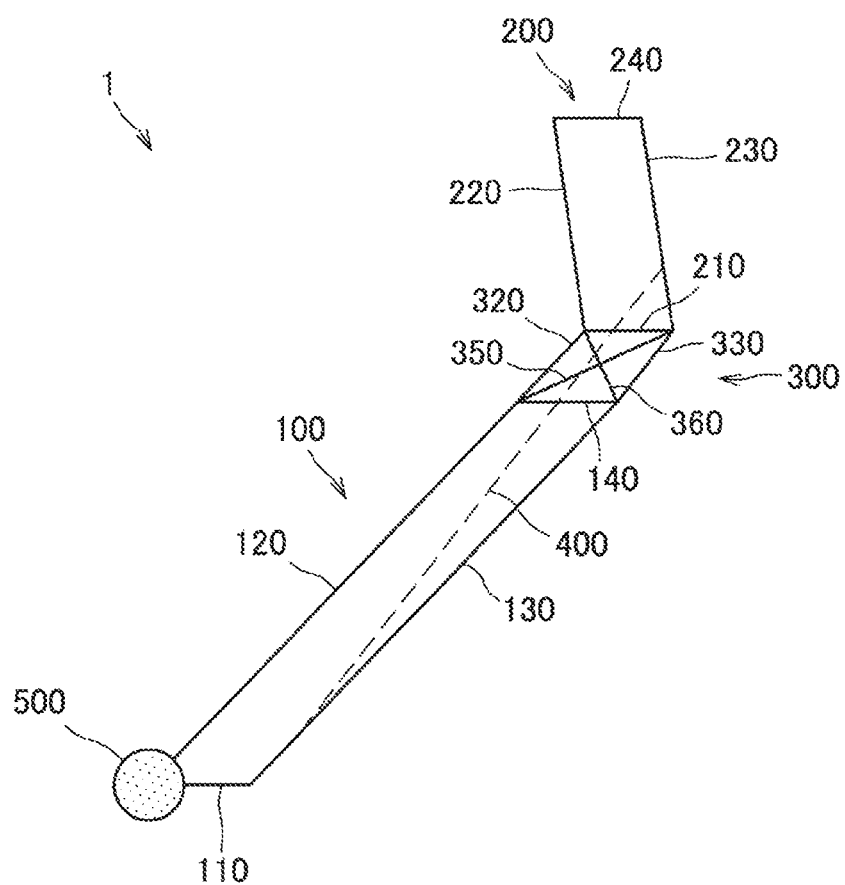
FIG. 1 is a schematic diagram illustrating a structure example of a link mechanism according to a first embodiment of the present disclosure.

Hereinafter, preferred embodiments of the present disclosure will be described in detail with reference to the accompanying drawings. Note that in the present specification and drawings, components having substantially the same functional structure will be denoted by the same reference signs, and a redundant description thereof will be omitted.

Note that the description will be given in the following order.
1. First embodiment
1.1. Structure of link mechanism
1.2. Operation by link mechanism
1.3. Design of link mechanism
2. Second embodiment
3. Modifications
3.1. Modifications of link mechanism
3.2. Modifications of gripper mechanism
4. Conclusion

1. First Embodiment

1.1. Structure of Link Mechanism

First, a structure of a link mechanism according to a first embodiment of the present disclosure will be described with reference to FIG. 1. FIG. 1 is a schematic diagram illustrating a structure example of a link mechanism 1 according to the present embodiment.

As illustrated in FIG. 1, the link mechanism 1 includes a first parallel link mechanism 100, a second parallel link mechanism 200, a fixed structure 300, a coupling link 400, and a drive unit 500.

The first parallel link mechanism 100 includes a fixed link 110 and an intermediate link 140 parallel to each other, and a pair of side links 120, 130 parallel to each other. The first parallel link mechanism 100 is a parallel link in which the fixed link 110, the intermediate link 140, the side link 120, and a side link 130 form a parallelogram shape.

The fixed link 110 is a link fixed to a base not illustrated. One end of the fixed link 110 is, for example, oscillatably joined by a joint to one end of the side link 120, and another end of the fixed link 110 is, for example, oscillatably joined by a joint to one end of the side link 130. Furthermore, the drive unit 500 is provided at the one end of the fixed link 110 joined to the one end of the side link 120.

The side link 120 is a driving link to which driving force is applied by the drive unit 500. One end of the side link 120 is, for example, oscillatably joined by a joint to one end of the fixed link 110, and another end of the side link 120 is, for example, oscillatably joined by a joint to one end of the intermediate link 140.

The side link 130 is a driven link that oscillates following oscillation of the side link 120 that is a driving link. One end of the side link 130 is, for example, oscillatably joined by a joint to another end of the fixed link 110, and another end of the side link 130 is, for example, oscillatably joined by a joint to another end of the intermediate link 140. Note that a length of the side link 130 may be the same as a length of the side link 120.

The intermediate link 140 is a link that connects the side link 120 that is a driving link and the side link 130 that is a driven link. One end of the intermediate link 140 is, for example, oscillatably joined by a joint to another end of the side link 120, and another end of the intermediate link 140 is, for example, oscillatably joined by a joint to another end of the side link 130. Note that a length of the intermediate link 140 may be the same as a length of the fixed link 110.

The second parallel link mechanism 200 includes a fixed link 210 and an intermediate link 240 parallel to each other, and a pair of side links 220, 230 parallel to each other. The second parallel link mechanism 200 is a parallel link in which the fixed link 210, the intermediate link 240, the side link 220, and a side link 230 form a parallelogram shape.

The fixed link 210 is a link that is fixed by being connected to the intermediate link 140 of the first parallel link mechanism 100 via the fixed structure 300. One end of the fixed link 210 is, for example, oscillatably joined by a joint to one end of the side link 220, and another end of the fixed link 210 is, for example, oscillatably joined by a joint to one end of the side link 230.

The side link 230 is a driving link to which driving force is applied by the coupling link 400 along with oscillation of the first parallel link mechanism 100. Specifically, driving force is applied to the side link 230 by a four-bar link mechanism oscillating along with oscillation of the first parallel link mechanism 100, the four-bar link mechanism being formed by the coupling link 400, the side link 130, a side link 330, and the side link 230. One end of the side link 230 is, for example, oscillatably joined by a joint to another end of the fixed link 210, and another end of the side link 230 is, for example, oscillatably joined by a joint to another end of the intermediate link 240.

The side link 220 is a driven link that oscillates following oscillation of the side link 230 that is a driving link. One end of the side link 220 is, for example, oscillatably joined by a joint to one end of the fixed link 210, and another end of the side link 220 is, for example, oscillatably joined by a joint to one end of the intermediate link 240. Note that a length of the side link 220 may be a length of the side link 230.

The intermediate link 240 is a link that connects the side link 230 that is a driving link and the side link 220 that is a driven link. One end of the intermediate link 240 is, for example, oscillatably joined by a joint to another end of the side link 220, and another end of the intermediate link 240 is, for example, oscillatably joined by a joint to another end of the side link 230. Note that a length of the intermediate link 240 may be the same as a length of the fixed link 210.

The intermediate link 240 corresponds to a tip end part of the link mechanism 1. Therefore, the intermediate link 240 may include various configurations for achieving a function of a device for which the link mechanism 1 is used. For example, in a case where the link mechanism 1 is used for a gripper mechanism, the intermediate link 240 may be provided with various sensors, a gripping part, a cover, or the like.

The fixed structure 300 is formed by the intermediate link 140 of the first parallel link mechanism 100, the fixed link 210 of the second parallel link mechanism 200, a pair of side links 320, 330 parallel to each other, and cross links 350, 360 intersecting each other. The fixed structure 300 is a rigid structure that does not deform along with oscillation of the link mechanism 1, and is formed by, for example, a truss structure. However, the fixed structure 300 may not necessarily be a link structure, and may be one rigid member. That is, the fixed structure 300 may be a single rigid member including a pivot that connects the first parallel link mechanism 100 and the second parallel link mechanism 200. The fixed structure 300 connects the first parallel link mechanism 100 and the second parallel link mechanism 200 in series.

The side links 320, 330 are links that connect the intermediate link 140 of the first parallel link mechanism 100 and the fixed link 210 of the second parallel link mechanism 200. Specifically, the side link 320 connects one end of the intermediate link 140 and one end of the fixed link 210, and the side link 330 connects another end of the intermediate link 140 and another end of the fixed link 210. With this arrangement, the side links 320, 330, the intermediate link 140, and the fixed link 210 form a rectangular shape.

For example, the side links 320, 330, the intermediate link 140, and the fixed link 210 may form a parallelogram shape. In such a case, the side link 320 and the side link 330 are provided so as to have the same length, and the intermediate link 140 and the fixed link 210 are provided so as to have the same length.

The cross links 350, 360 are links that allow the rectangular shape formed by the side links 320, 330, the intermediate link 140, and the fixed link 210 to have a rigid structure that does not deform. Specifically, the cross link 350 connects one end of the intermediate link 140 and another end of the fixed link 210, and the cross link 360 connects another end of the intermediate link 140 and one end of the fixed link 210. With this arrangement, the cross links 350, 360 are provided along diagonal lines of the rectangular shape formed by the side links 320, 330, the intermediate link 140, and the fixed link 210, allowing the fixed structure 300 to be a rigid truss structure.

The coupling link 400 is a link that couples the side link 130 of the first parallel link mechanism 100 and the side link 230 of the second parallel link mechanism 200. Specifically, one end of the coupling link 400 is oscillatably joined by a joint to any position of the side link 130, and another end of the coupling link 400 is oscillatably joined by a joint to any position of the side link 230. With this arrangement, the coupling link 400 forms a four-bar link structure with the side link 130, the side link 330, and the side link 230, and can oscillate the side link 230 along with oscillation of the side link 130. That is, the coupling link 400 can transmit driving force to the side link 230 of the second parallel link mechanism 200 along with oscillation of the first parallel link mechanism 100.

Note that the coupling link 400 is required at least to couple either one of the side link 120 or 130 of the first parallel link mechanism 100 and either one of the side link 220 or 230 of the second parallel link mechanism 200. Therefore, not limited to an example illustrated in FIG. 1, the coupling link 400 may couple the side link 120 and the side link 220, may couple the side link 130 and the side link 220, and may couple the side link 120 and the side link 230.

A joining position between the coupling link 400 and the side link 130, and a joining position between the coupling link 400 and the side link 230 may be optimized so that the intermediate link 240 of the second parallel link mechanism 200, which is the tip end part of the link mechanism 1, makes a more linear motion. Specifically, the joining position between the coupling link 400 and the side link 130 and the joining position between the coupling link 400 and the side link 230 may be set on the basis of lengths of each link of the first parallel link mechanism 100 and the second parallel link mechanism 200, and a length of the coupling link 400. Methods for setting these will be described later.

The drive unit 500 applies driving force to the side link 120. Specifically, to the side link 120, the drive unit 500 applies driving force that oscillates about a joint that couples one end of the side link 120 and one end of the fixed link 110. With this arrangement, the link mechanism 1 can oscillate about the joint. An oscillatory motion by the drive unit 500 may be made within a range of 90°, for example. The drive unit 500 may be, for example, an actuator such as a motor that is capable of a rotary motion, or an actuator such as a linear motor or a cylinder that is capable of a linear motion.

In the link mechanism 1 including the above-described structure, oscillation of the first parallel link mechanism 100 can be transmitted to the second parallel link mechanism 200 by the coupling link 400, and therefore it is possible to cause the intermediate link 240, which is the tip end part, to make a substantially linear motion.

1.2. Operation by Link Mechanism

Figure 2:
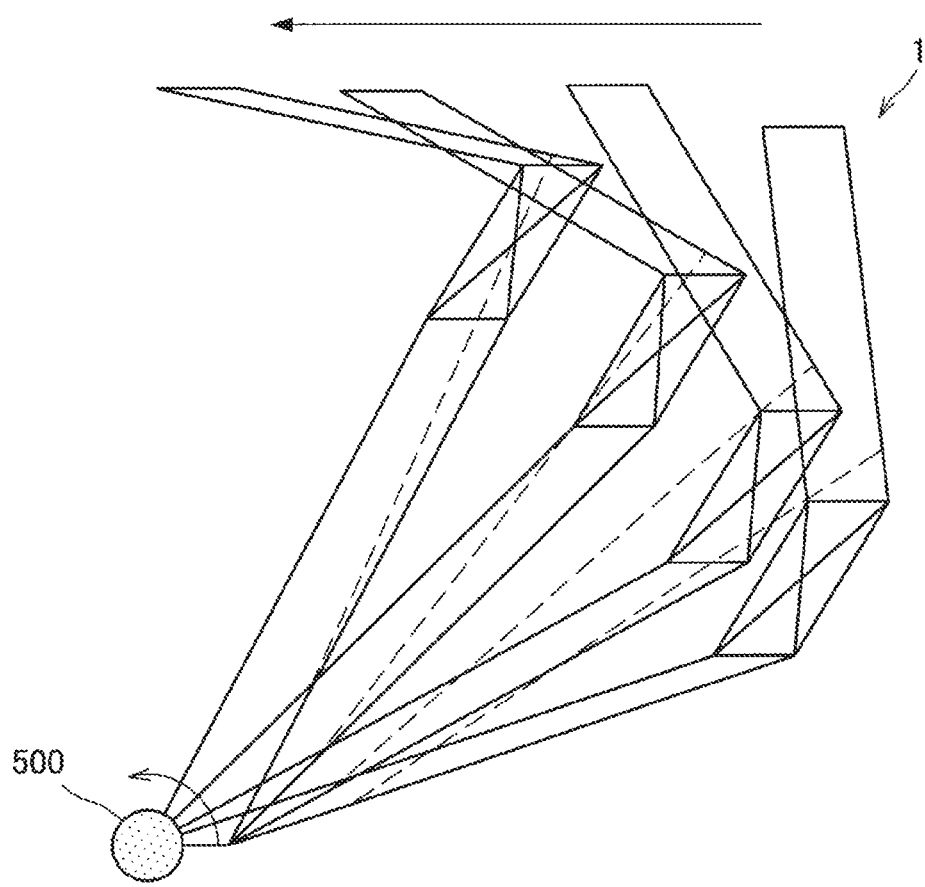
FIG. 2 is an explanatory diagram schematically illustrating transition of operation by the link mechanism according to the embodiment.

Next, operation by the link mechanism 1 according to the present embodiment will be described with reference to FIG. 2. FIG. 2 is an explanatory diagram schematically illustrating transition of operation by the link mechanism 1 according to the present embodiment.

As illustrated in FIG. 2, in a case where the link mechanism 1 is operated counterclockwise by the drive unit 500, the first parallel link mechanism 100 to which the driving force is transmitted oscillates counterclockwise. At this time, by oscillation of the first parallel link mechanism 100, driving force is transmitted to the four-bar link structure formed by the coupling link 400, the side link 130, the side link 330, and the side link 230, and therefore, the four-bar link structure also oscillates counterclockwise. With this arrangement, the driving force is transmitted to the side link 230 of the second parallel link mechanism 200 by oscillation of the four-bar link structure, and therefore, the second parallel link mechanism 200 can oscillate counterclockwise, also. Therefore, the second parallel link mechanism 200 to which the driving force is transmitted by the coupling link 400 oscillates in the same direction as an oscillation direction of the first parallel link mechanism 100.

Here, in a case where the driving force is not transmitted to the second parallel link mechanism 200, and the second parallel link mechanism 200 does not oscillate, the intermediate link 240 makes a circular motion about one end of the fixed link 110. Therefore, along with oscillation of the link mechanism 1, a depth from the base to the intermediate link 240 changes. Specifically, as the link mechanism 1 operates counterclockwise, a depth from the intermediate link 240 to the base increases.

Meanwhile, the link mechanism 1 according to the present embodiment can, with the coupling link 400, oscillate the second parallel link mechanism 200 along with oscillation of the first parallel link mechanism 100. Therefore, the link mechanism 1 according to the present embodiment can draw the intermediate link 240 to a base side so that a depth from the intermediate link 240 to the base does not increase as the link mechanism 1 operates counterclockwise. Therefore, the link mechanism 1 according to the present embodiment can oscillate the intermediate link 240, which is the tip end part, in a trajectory closer to a straight line. With this arrangement, as illustrated in FIG. 2, the link mechanism 1 can cause the intermediate link 240 to make a substantially linear motion without almost changing the depth from the intermediate link 240 to the base.

1.3. Design of Link Mechanism

Figure 3:
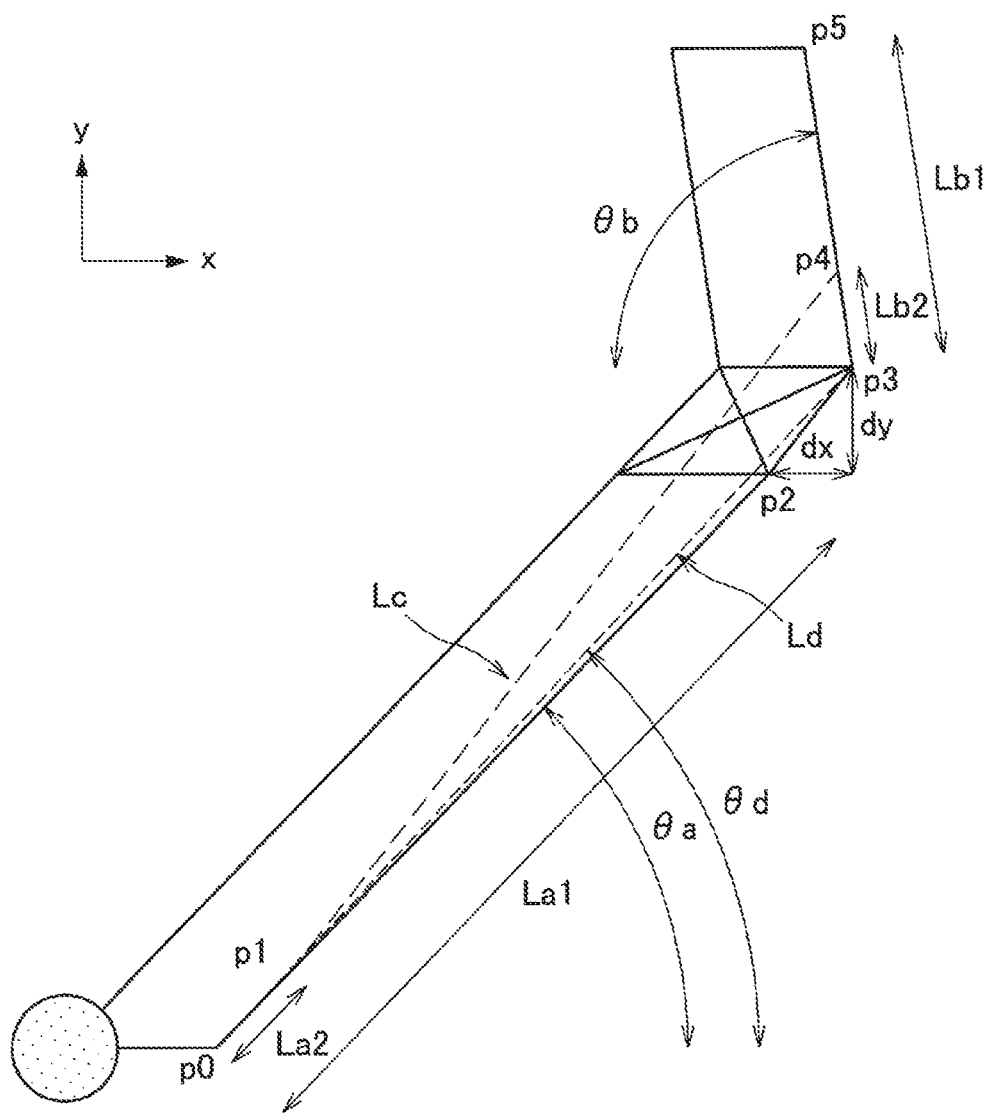
FIG. 3 is an explanatory diagram for describing a method for designing the link mechanism according to the embodiment.

Next, a method for designing the link mechanism 1 according to the present embodiment will be described with reference to FIG. 3. FIG. 3 is an explanatory diagram for describing a method for designing the link mechanism 1 according to the present embodiment.

As described above, the link mechanism 1 according to the present embodiment can cause the intermediate link 240, which is the tip end part, to make a substantially linear motion. However, in order to oscillate the intermediate link 240, which is the tip end part of the link mechanism 1, in a trajectory closer to a straight line, it is important to appropriately design joining positions of the coupling link 400 and the side links 130, 230, and a length of each link.

First, as illustrated in FIG. 3, a length, or the like, of each link is defined. Note that, in FIG. 3, an x-axis and x-coordinate are defined in a direction from left to right when FIG. 3 is viewed from front, and a y-axis and y-coordinate are defined in a direction from bottom to top when FIG. 3 is viewed from front. An origin may be p0, which is one end of the side link 130, for example.

La1: Length of the side link 130 (distance from p0 to p2).
La2: Distance from one end of the side link 130 (p0) to a joining position of the coupling link 400 (p1).
Lb1: Length of the side link 230 (distance from p3 to p5).
Lb2: Distance from one end of the side link 230 (p3) to a joining position of the coupling link 400 (p4).
Lc: Length of the coupling link 400 (distance from p1 to p4).
dx, dy: Difference in an x-coordinate and a y-coordinate between another end of the side link 130 (p2) and one end of the side link 230 (p3).
θa: Oscillation angle by the drive unit 500 (an angle formed by the fixed link 110 and the side link 130).
Ld: Distance from one end of a coupling link (p1) to one end of the side link 230 (p3).
θd: Angle formed by a straight line including the fixed link 110 and a straight line virtually connecting one end of the coupling link (p1) and one end of the side link 230 (p3).

Note that a length of each link of the link mechanism 1 not defined above has no particular effect on a purpose of oscillating the intermediate link 240, which is the tip end part, in a trajectory closer to a straight line. Therefore, the length of each link of the link mechanism 1 not defined above may be any length as long as actual design of the link mechanism 1 allows.

Here, La1, La2, Lb1, Lb2, and Lc are defined as lengths of links, and therefore have the following constraint conditions. When a depth from the tip end part to base of the link mechanism 1 is Lmax, Lmax has the following constraint conditions.

$$La1 > La2 > 0$$

$$Lb1 > Lb2 > 0$$

$$Lc > 0$$

$$Lmax > La1 + dy + Lb1$$

dx, dy are determined by a size of the fixed structure 300. Because the fixed structure 300 is a structure that does not deform when the link mechanism 1 operates, and is designed not to become excessively large, an absolute value of dx, dy may also be designed not to become too large.

Under such constraint conditions, each parameter of the link mechanism 1 can be appropriately designed by calculating with a simulation each parameter that minimizes a change of another end of the side link 230 (p5) in a y-coordinate (p5y). With this arrangement, it is possible to appropriately design the joining positions of the coupling link 400 and the side links 130, 230, and the length of each link.

Note that a range for the simulation is 0 deg<θa<90 deg. However, because it is not necessary to consider a case where one end of the side link 230 (p3) comes closer to a drive unit 500 side than another end of the side link 230 (p5), 0 deg<θb<90 deg is added as a constraint condition. This is because it becomes difficult for the intermediate link 240 to function as a gripping part if the one end of the side link 230 (p3) projects beyond another end of the side link 230 (p5) in a case where the link mechanism 1 is used for a gripper mechanism.

The y-coordinate (p5y) of another end of the side link 230 (p5) is calculated according to the following formula. Note that x-coordinates or y-coordinates of p1, p3, and p5 are described as p1x, p1y, p3x, p3y, p5x, and p5y.

$$p1x = La2 \times \cos(\theta a)$$

$$p1y = La2 \times \sin(\theta a)$$

$$p3x = La1 \times \cos(\theta a) + dx$$

$$p3y = La1 \times \sin(\theta a) + dy$$

$$\theta d = \arctan((p3y - p1y)/(p3x - p1x))$$

$$Ld = \sqrt{((p3y - p1y)^2 + (p3x - p1x)^2)}$$

$$\theta d + \theta b = \arccos((Lb2^2 + Ld^2 - Lc^2)/(2 \times Lb2 \times Ld))$$

$$\theta b = \arccos((Lb2^2 + Ld^2 - Lc^2)/(2 \times Lb2 \times Ld)) - \theta d$$

$$p5x = p3x - Lb1 \times \cos(\theta b)$$

$$p5y = p3y + Lb1 \times \sin(\theta b)$$

With this arrangement, it is possible to calculate each parameter of the link mechanism 1 by which a change amount of p5y becomes extremely small within a range of 0 deg<θa<90 deg. Note that, in a case where the link mechanism 1 is actually operated, it is considered that it is extremely infrequent to operate the link mechanism 1 within a range of near θa=0 deg or 90 deg, and therefore, a range of θa in the simulation may be narrower than the above-described range. For example, a range for the simulation may be 25 deg<θa<75 deg.

It is possible to oscillate the intermediate link 240 in a trajectory closer to a straight line by using such a simulation to appropriately design the joining positions of the coupling link 400 and side links 130, 230, and a length of each link of the link mechanism 1. For example, by joining the coupling link 400 to a position closer to one end of each of the side link 130 and side link 230, it is possible to oscillate the intermediate link 240 in a trajectory closer to a straight line.

2. Second Embodiment

Figure 4A:
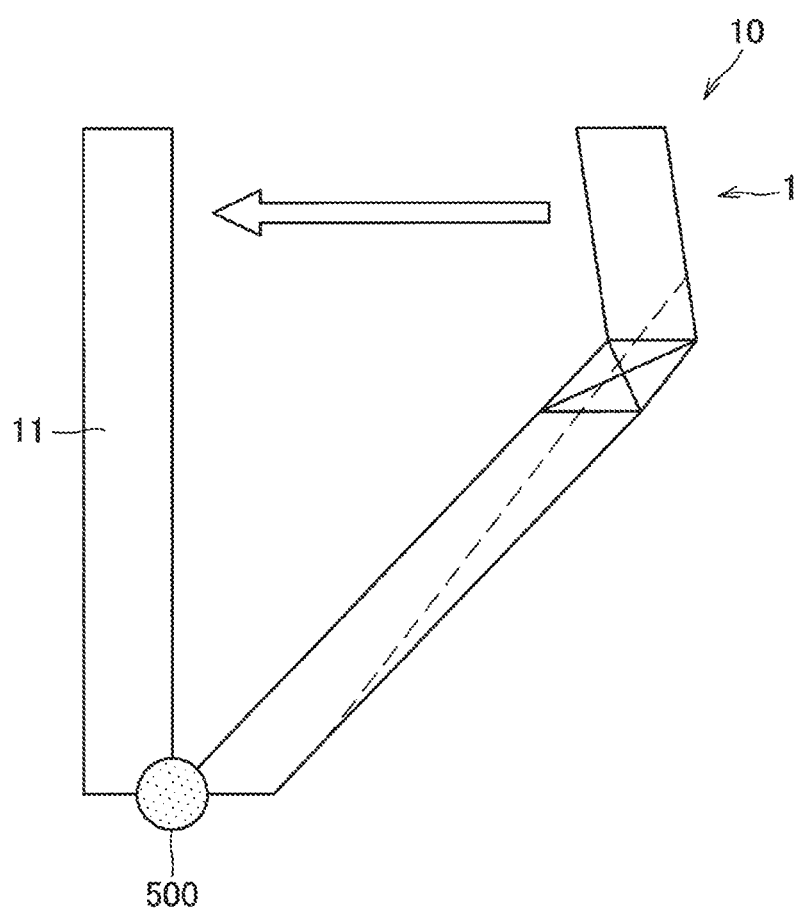
FIG. 4A is an explanatory diagram schematically illustrating a first structure example of a gripper mechanism according to a second embodiment of the present disclosure.
Figure 4B:
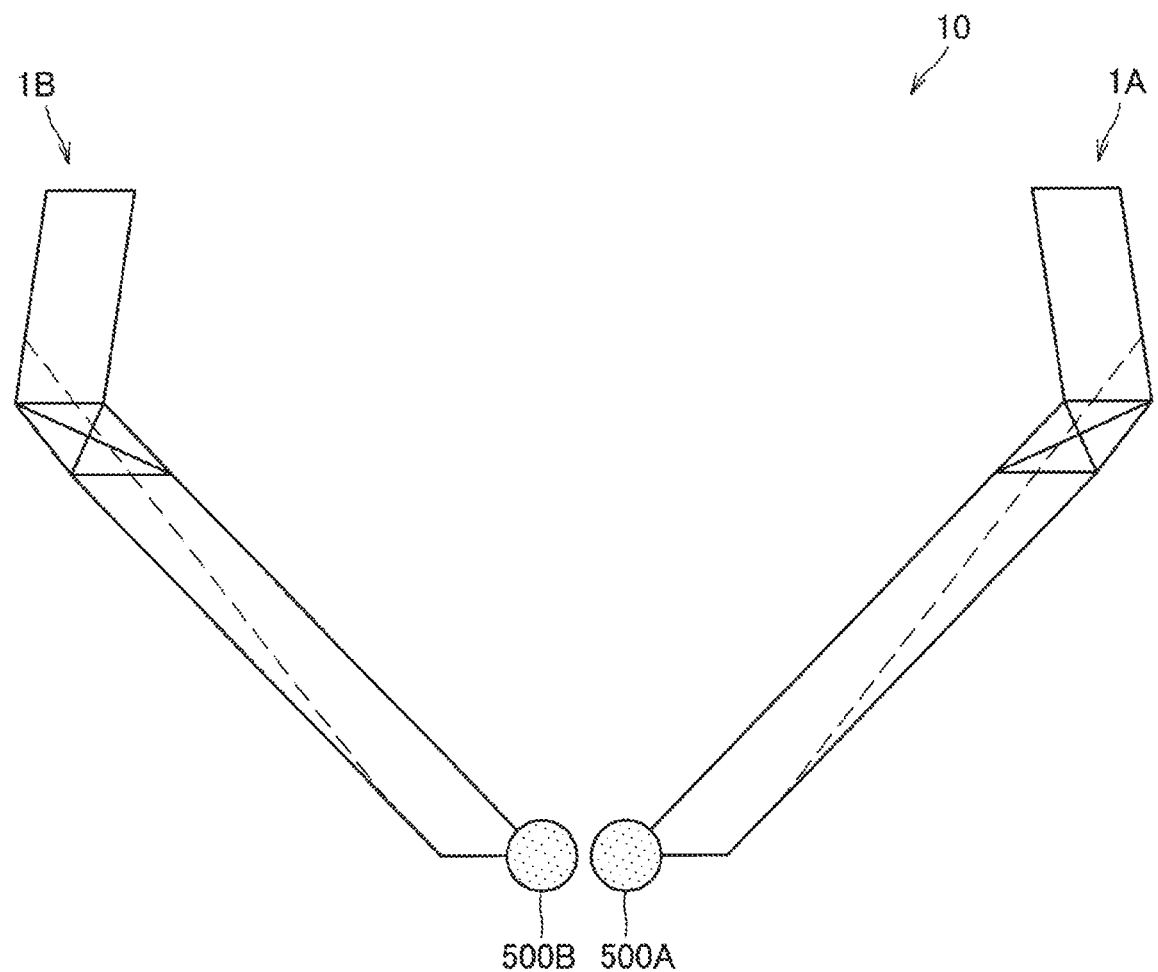
FIG. 4B is an explanatory diagram schematically illustrating a second structure example of the gripper mechanism according to the second embodiment of the present disclosure.

Next, a gripper mechanism according to a second embodiment of the present disclosure will be described with reference to FIGS. 4A and 4B. The gripper mechanism according to the present embodiment is a gripper mechanism or hand mechanism that grips an object by using a link mechanism 1 according to the first embodiment. FIG. 4A is an explanatory diagram schematically illustrating a first structure example of the gripper mechanism according to the present embodiment. FIG. 4B is an explanatory diagram schematically illustrating a second structure example of the gripper mechanism according to the present embodiment.

First Structure Example

As illustrated in FIG. 4A, a gripper mechanism 10 according to the first structure example includes the link mechanism 1 and a finger member 11.

The finger member 11 is a structural member having a length equivalent to a length of the link mechanism 1 and fixed to the link mechanism 1. The link mechanism 1 includes a structure similar to a structure of the link mechanism described in the first embodiment, and is provided so as to be able to oscillate toward the finger member 11 by a drive unit 500. With this arrangement, the link mechanism 1 oscillated by the drive unit 500 can reduce a mutual distance between a tip end part of the finger member 11 and a tip end part of the link mechanism 1, and therefore the gripper mechanism 10 can grip an object.

In the gripper mechanism 10 according to the present embodiment, the tip end part of the link mechanism 1 approaches the tip end part of the finger member 11 in a substantially linear trajectory, and therefore it is possible to grip the object without considering a crash into a floor, or the like, where the object is placed. With this arrangement, the gripper mechanism 10 can further simplify control in a case where the object is gripped.

Note that the gripper mechanism 10 may be provided with various configurations included in a known gripper mechanism or hand mechanism. For example, the tip end part of the finger member 11 or the tip end part of the link mechanism 1 may be provided with various sensors such as a multiaxial force sensor, a load cell, a pressure sensor, a tactile sensor, a distance measuring sensor, a temperature sensor, an acceleration sensor, a gyro sensor, or a camera. Furthermore, the tip end part of the finger member 11 or the tip end part of the link mechanism 1 may include a protrusion or a waveform for gripping the object, and may be provided with gel, or the like, for friction generation or pressure mitigation. Furthermore, the gripper mechanism 10 may be provided with a cover for waterproof, drip-proof, appearance, or cleanliness. Moreover, the drive unit 500 may be provided with a torque sensor, a brake, or the like.

Second Structure Example

As illustrated in FIG. 4B, a gripper mechanism 20 according to a second structure example includes a plurality of link mechanisms. Specifically, the gripper mechanism 20 according to the second structure example includes a first link mechanism 1A and a second link mechanism 1B.

The first link mechanism 1A includes a structure similar to a structure of the link mechanism described in the first embodiment, and is provided so as to be able to oscillate toward the second link mechanism 1B by a drive unit 500A. Furthermore, the second link mechanism 1B includes a structure similar to a structure of the link mechanism described in the first embodiment, and is provided so as to be able to oscillate toward the first link mechanism 1A by a drive unit 500B. With this arrangement, the gripper mechanism 20 can oscillate the first link mechanism 1A and the second link mechanism 1B with the drive unit 500A and the drive unit 500B and can reduce a mutual distance between a tip end part of the first link mechanism 1A and a tip end part of the second link mechanism 1B, and therefore the gripper mechanism 20 can grip an object.

Here, the first link mechanism 1A and the second link mechanism 1B may oscillate independently of each other, or may oscillate in conjunction with each other so as to move symmetrically. Furthermore, the first link mechanism 1A and the second link mechanism 1B may have similar structures or different structures. Moreover, the drive unit 500A and the drive unit 500B may be actuators having similar mechanisms or actuators having different mechanisms.

Note that, as similar to the first structure example, the gripper mechanism 20 may be provided with various configurations included in a known gripper mechanism or hand mechanism. For example, the tip end part of the first link mechanism 1A or the tip end part of the second link mechanism 1B may be provided with various sensors such as a multiaxial force sensor, a load cell, a pressure sensor, a tactile sensor, a distance measuring sensor, a temperature sensor, an acceleration sensor, a gyro sensor, or a camera. Furthermore, the tip end part of the first link mechanism 1A or the tip end part of the second link mechanism 1B may include a protrusion or a waveform for gripping the object, and may be provided with gel, or the like, for friction generation or pressure mitigation. Furthermore, the gripper mechanism 20 may be provided with a cover for waterproof, drip-proof, appearance, or cleanliness. Moreover, the drive unit 500A, 500B may be provided with a torque sensor, a brake, or the like.

Note that, although FIG. 4B illustrates an example in which the gripper mechanism 20 includes two link mechanisms, the first link mechanism 1A and the second link mechanism 1B, the gripper mechanism 20 according to the second structure example is not limited to such an example. The gripper mechanism 20 according to the second structure example may include three or more link mechanisms. The larger the number of link mechanisms the gripper mechanism 20 includes, the more reliably the gripper mechanism 20 can grip the object. However, in a case where there are an excessively large number of link mechanisms, a structure of the gripper mechanism 20 becomes complex or large, and therefore, the number of link mechanisms included in the gripper mechanism 20 may be about three or four.

3. Modifications

3.1. Modifications of Link Mechanism

Next, modifications of the link mechanism 1 according to the first embodiment of the present disclosure will be described with reference to FIGS. 5, 6A, 6B, 7, and 8.

Variations in Structures of Link Mechanism

Figure 5:
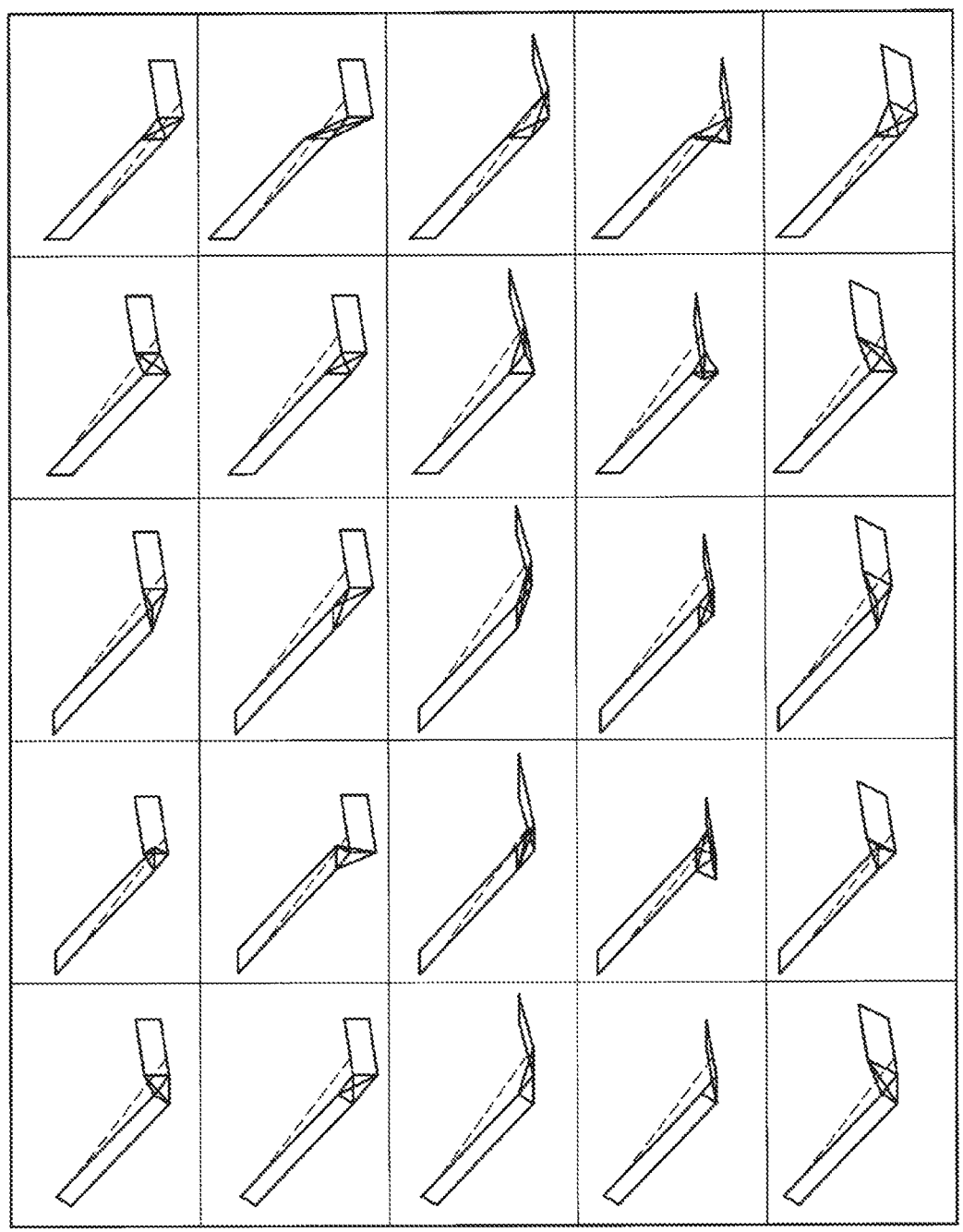
FIG. 5 is a chart comprehensively illustrating variations in structures of the link mechanism according to the first embodiment.

First, variations in structures of the link mechanism 1 according to the first embodiment will be described with reference to FIG. 5. FIG. 5 is a chart comprehensively illustrating variations in structures of the link mechanism 1 according to the first embodiment.

As illustrated in FIG. 5, the link mechanism 1 according to the first embodiment is not limited to the structure illustrated in FIG. 1 and can be achieved with various structures.

The link mechanism 1 includes a structure in which the first parallel link mechanism 100 and the second parallel link mechanism 200 are connected in series with the fixed structure 300, and either one of the side link 120 or 130 of the first parallel link mechanism 100 and either one of the side link 220 or 230 of the second parallel link mechanism 200 are coupled with the coupling link 400. Among these, a four-bar link formed by the coupling link 400, the side link 120 or 130, any one of the links that forms the fixed structure 300 (that is, the side link 320 or 330, or the cross link 350 or 360), and the side link 220 or 230 is a basic skeleton of the link mechanism 1. There may be various variations of the structure of the link mechanism 1, which are illustrated in FIG. 5, conceived by considering in what orientation or shape the first parallel link mechanism 100, the second parallel link mechanism 200, and the fixed structure 300 are to be connected to the four-bar link as the basic skeleton.

In a horizontal direction when FIG. 5 is viewed from front, FIG. 5 describes variations in an extending direction of the fixed link 210 in a case where an extending direction of the fixed link 110 is fixed, and variations in a connection direction of the second parallel link mechanism 200 to the four-bar link as the basic skeleton. Furthermore, in a vertical direction when FIG. 5 is viewed from front, FIG. 5 describes variations in an extending direction of the fixed link 110 in a case where an extending direction of the fixed link 210 is fixed, and variations in a connection direction of the first parallel link mechanism 100 to the four-bar link as the basic skeleton. The link mechanism 1 may be achieved in various structures by combining these variations.

First Modification

Figure 6A:
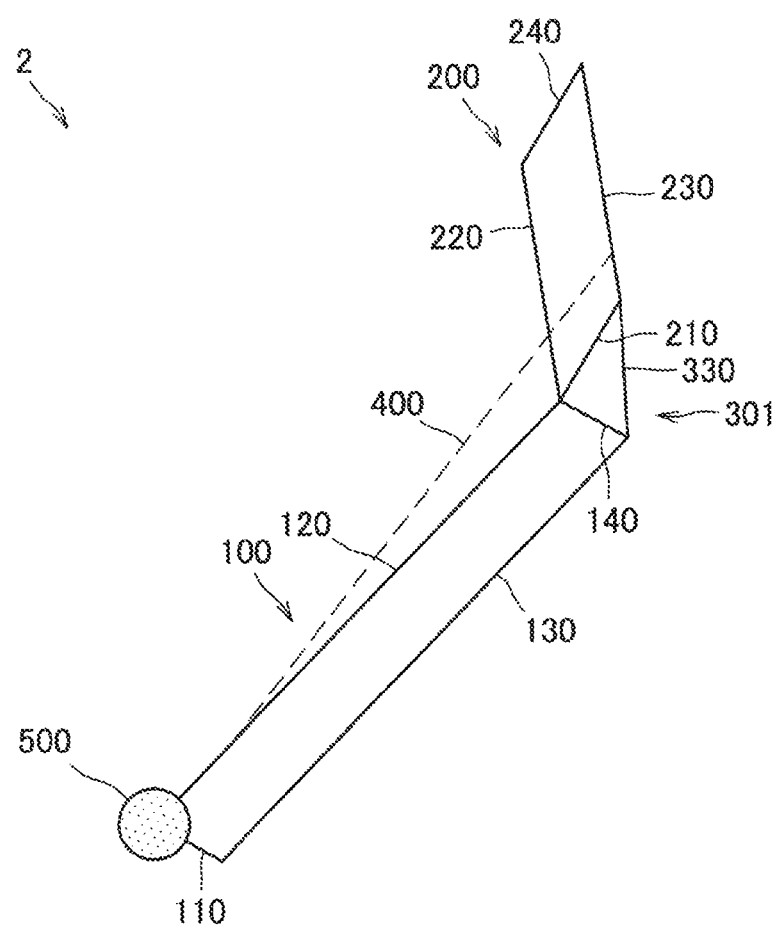
FIG. 6A is an explanatory diagram schematically illustrating an example of a structure of a link mechanism according to a first modification.

Next, a first modification of the link mechanism 1 according to the first embodiment will be described with reference to FIG. 6A and FIG. 6B. FIG. 6A is an explanatory diagram schematically illustrating an example of a structure of the link mechanism according to the first modification, and FIG. 6B is an explanatory diagram schematically illustrating another example of a structure of the link mechanism according to the first modification.

Figure 6B:
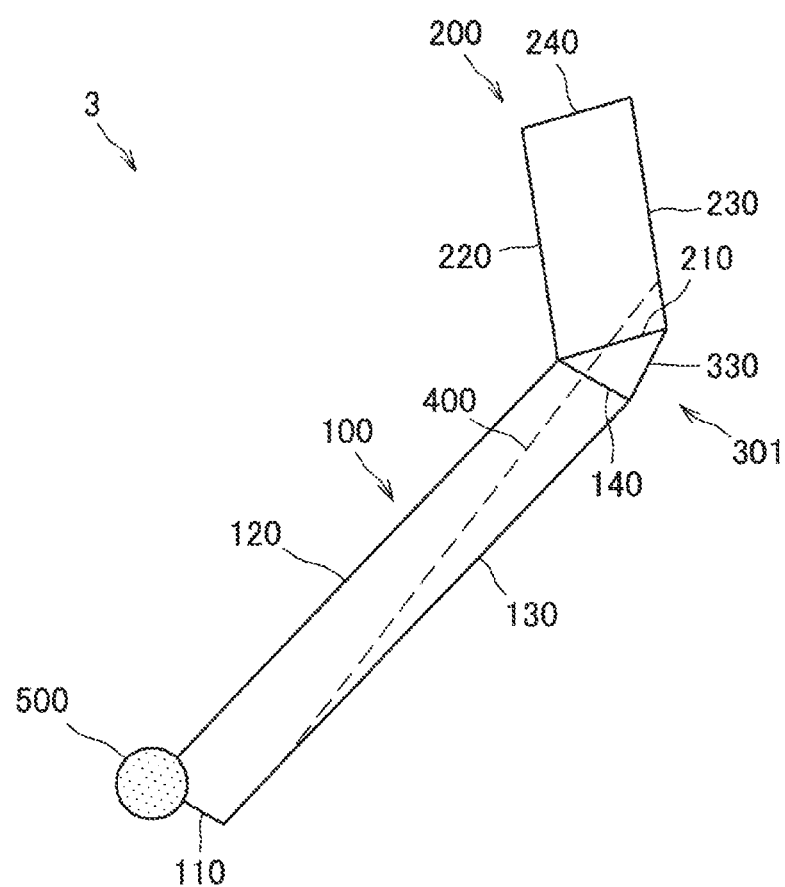
FIG. 6B is an explanatory diagram schematically illustrating another example of a structure of the link mechanism according to the first modification.

As illustrated in FIGS. 6A and 6B, in link mechanisms 2, 3, a fixed structure 301 connecting the first parallel link mechanism 100 and the second parallel link mechanism 200 in series is formed by the intermediate link 140, the side link 330, and the fixed link 210. Specifically, one end of the intermediate link 140 is joined to one end of the fixed link 210, another end of the intermediate link 140 is joined to one end of the side link 330, and another end of the side link 330 is joined to another end of the fixed link 210. With this arrangement, the fixed structure 301 forms a truss structure formed by a triangle, and therefore, it is possible to connect the first parallel link mechanism 100 and the second parallel link mechanism 200 in series with a rigid structure that does not deform.

The fixed structure 301 is required at least to be an inflexible structure that does not deform along with oscillation of the link mechanisms 2, 3. Therefore, the fixed structure 301 can adopt another truss structure instead of the triangular shape truss structures illustrated in FIGS. 6A and 6B, as long as the structure is a truss structure with a triangle as a base unit. Furthermore, the fixed structure 301 can adopt an undeformable structure formed by a single member, instead of a truss structure.

Because configurations other than the configurations of the above-described link mechanisms 2, 3 are the same as the configuration described with reference to FIG. 1, the description thereof is not repeated here.

Note that the link mechanism 2 illustrated in FIG. 6A and the link mechanism 3 illustrated in FIG. 6B have different side links joined by the coupling link 400. Specifically, the side link 120 and the side link 230 are coupled by the coupling link 400 in the link mechanism 2 illustrated in FIG. 6A, and the side link 130 and the side link 230 are coupled by the coupling link 400 in the link mechanism 3 illustrated in FIG. 6B. As described above, also in a case where the coupling link 400 couples either of the side link 120 or 130 and either of the side link 220 or 230, the link mechanisms 2, 3 can similarly oscillate the intermediate link 240 in a trajectory closer to a straight line.

Second Modification

Figure 7:
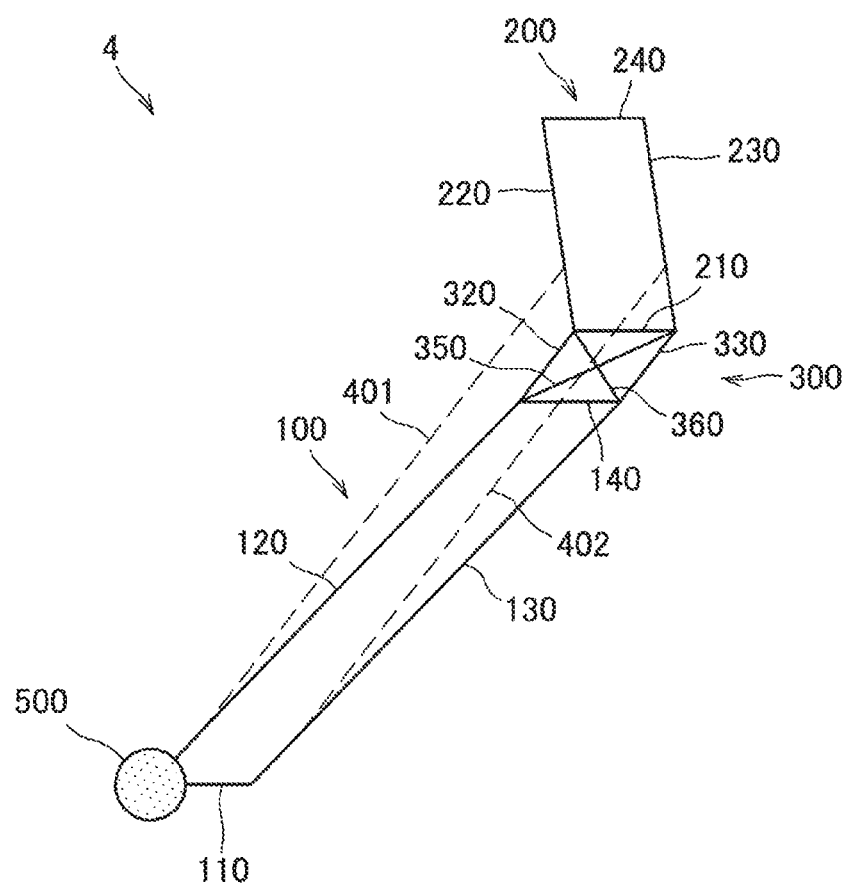
FIG. 7 is an explanatory diagram schematically illustrating an example of a structure of a link mechanism according to a second modification.

Next, a second modification of the link mechanism 1 according to the first embodiment will be described with reference to FIG. 7. FIG. 7 is an explanatory diagram schematically illustrating an example of a structure of a link mechanism 4 according to the second modification.

As illustrated in FIG. 7, the link mechanism 4 is provided with a plurality of coupling links. Specifically, the link mechanism 4 is provided with a first coupling link 401 and a second coupling link 402. One end of the first coupling link 401 is oscillatably joined by a joint to any position of the side link 120, and another end of the first coupling link 401 is oscillatably joined by a joint to any position of the side link 220. Furthermore, one end of the second coupling link 402 is oscillatably joined by a joint to any position of the side link 130, and another end of the second coupling link 402 is oscillatably joined by a joint to any position of the side link 230. With this arrangement, the link mechanism 4 can further enhance strength of an entire structure.

However, in the link mechanism 4 according to the second modification, the first coupling link 401 and the second coupling link 402 are provided so as to be parallel to each other in order to equalize an amount of oscillation between the first coupling link 401 and the second coupling link 402, the oscillation being along with oscillation of the first parallel link mechanism 100. Such a structure can be achieved by, for example, each of the first parallel link mechanism 100 and the second parallel link mechanism 200 being a parallel link, and the fixed structure 300 having a parallelogram shape. Note that in a case where the fixed structure 300 is not in a parallelogram shape, it may be difficult to oscillate the link mechanism 4 smoothly, because an amount of oscillation differs between the first coupling link 401 and the second coupling link 402 when the first parallel link mechanism 100 oscillates.

Furthermore, the first coupling link 401 and the second coupling link 402 may respectively couple the same side link of the first parallel link mechanism 100 and the same side link of the second parallel link mechanism 200. For example, the first coupling link 401 and the second coupling link 402 may be oscillatably joined by a joint to the side link 120 at one end each, and may be oscillatably joined by a joint to the side link 220 at another end each. In such a case, the first coupling link 401 and the second coupling link 402 are provided on both sides so as to sandwich structural members that form the first parallel link mechanism 100, the fixed structure 300, and the second parallel link mechanism 200. That is, the first coupling link 401 and the second coupling link 402 are provided on a front side and a back side of the link mechanism 4, respectively, with respect to a paper surface of FIG. 7.

Because configurations other than the above-described configuration of the link mechanism 4 are the same as the configuration described with reference to FIG. 1, the description thereof is not repeated here.

Third Modification

Figure 8:
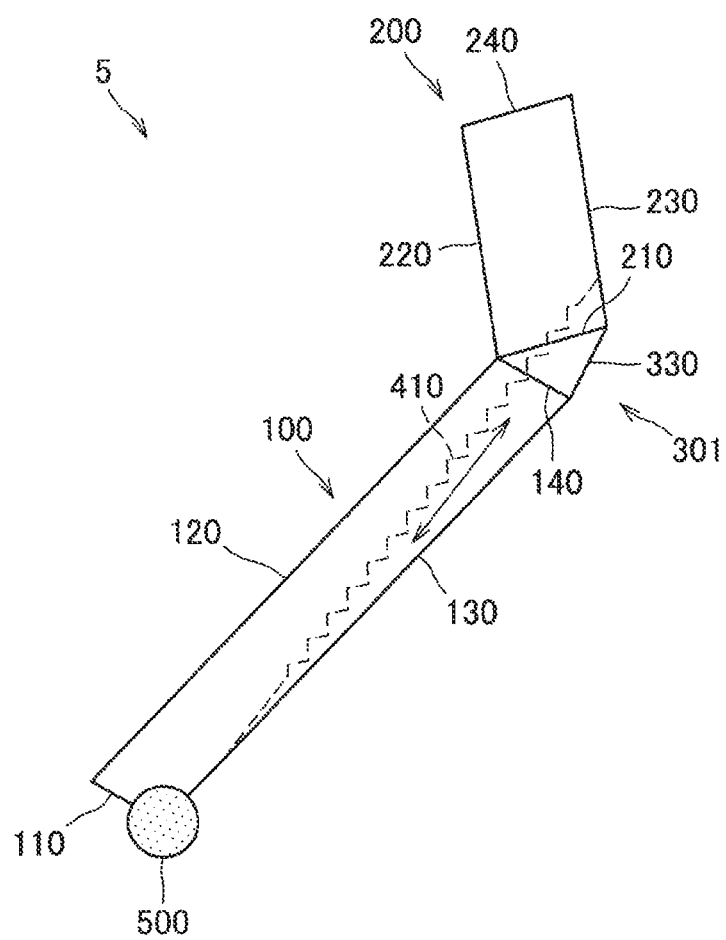
FIG. 8 is an explanatory diagram schematically illustrating an example of a structure of a link mechanism according to a third modification.

Next, a third modification of the link mechanism 1 according to the first embodiment will be described with reference to FIG. 8. FIG. 8 is an explanatory diagram schematically illustrating an example of a structure of a link mechanism 5 according to the third modification.

As illustrated in FIG. 8, in the link mechanism 5, a coupling link 410 is formed by an elastic body capable of extension and contraction in an extending direction. Specifically, the coupling link 410 may be formed by a material that is capable of extension and contraction in the extending direction and is difficult to deform in a direction orthogonal to the extending direction. For example, the coupling link 410 may be formed by a coil spring, or the like. Note that one end of the coupling link 410 may be oscillatably joined by a joint to the side link 130, and another end of the coupling link 410 may be oscillatably joined by a joint to the side link 230.

In such a case, the coupling link 410 can elastically deform in the extending direction, and therefore, driving force transmitted to the second parallel link mechanism 200 is reduced, and the intermediate link 240 is less likely to make a substantially linear motion. Meanwhile, the coupling link 410 can absorb an impact applied to the intermediate link 240 by elastically deforming in the extending direction. For example, in a case where the link mechanism 5 is used for a gripper mechanism or a hand mechanism, a large impact or external force may be applied to the intermediate link 240 that is a tip end part. Forming the coupling link 410 with an elastic body allows the coupling link 410 to have an impact absorption property, and therefore, the coupling link 410 can mitigate an impact or external force applied to the intermediate link 240 and can prevent damage to the link mechanism 5.

Furthermore, an amount of deformation of the coupling link 410 formed by an elastic body is affected by magnitude of external force applied to the intermediate link 240. Therefore, the link mechanism 5 can also determine magnitude of external force applied to the intermediate link 240 by measuring an amount of deformation of the coupling link 410 formed by an elastic body. For example, in a case where the link mechanism 5 is used for a gripper mechanism or a hand mechanism, it is possible to measure gripping force of the gripper mechanism or the hand mechanism with a simpler and less expensive structure by measuring an amount of deformation of the coupling link 410 formed by the elastic body by using an encoder, or the like.

Because configurations other than the configuration of the above-described link mechanism 5 are the same as the configuration described with reference to FIG. 1, FIG. 6A, or FIG. 6B, the description thereof is not repeated here.

3.2. Modifications of Gripper Mechanism

Figure 9A:
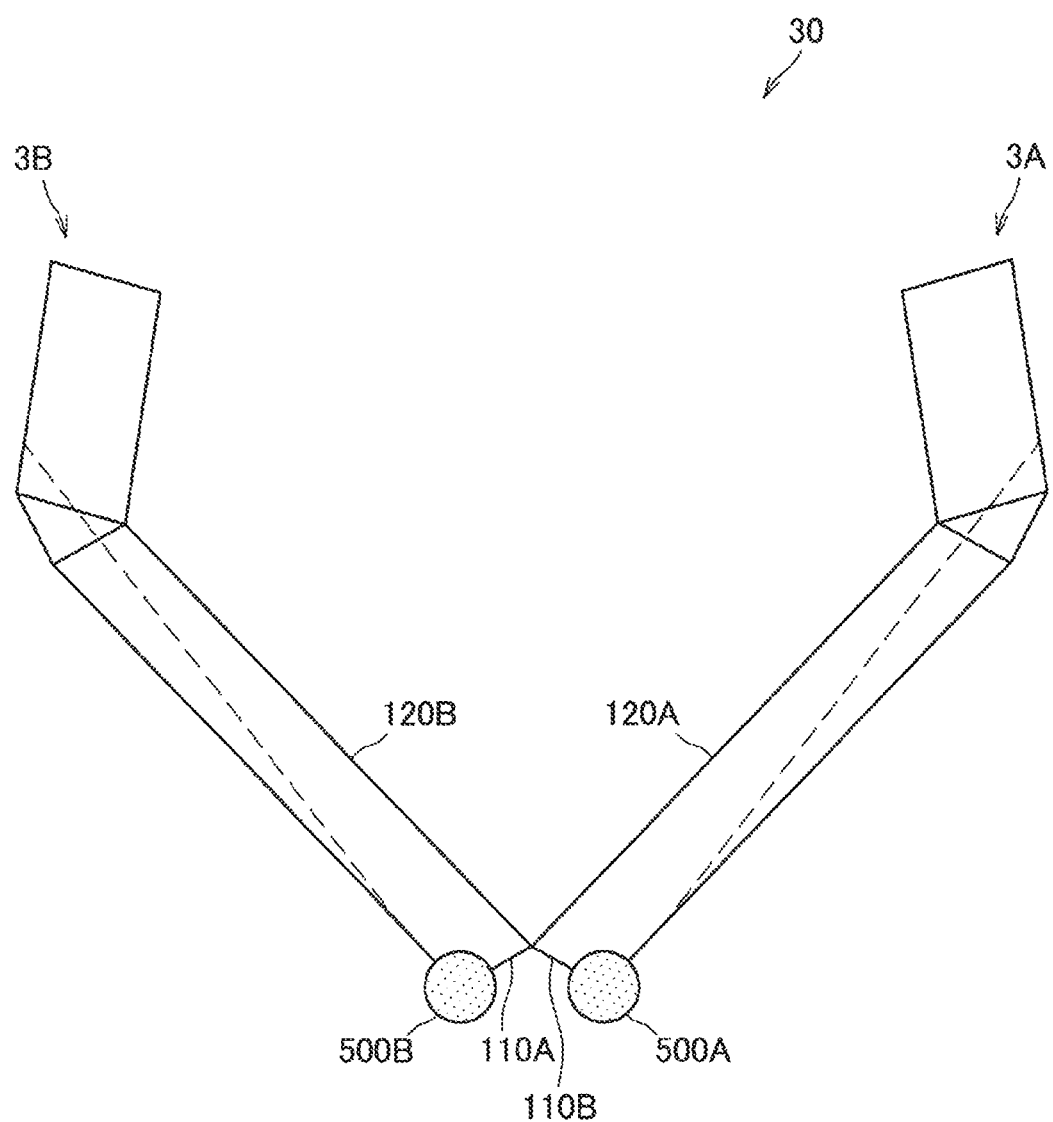
FIG. 9A is an explanatory diagram schematically illustrating a structure of a gripper mechanism according to the first modification.
Figure 9B:
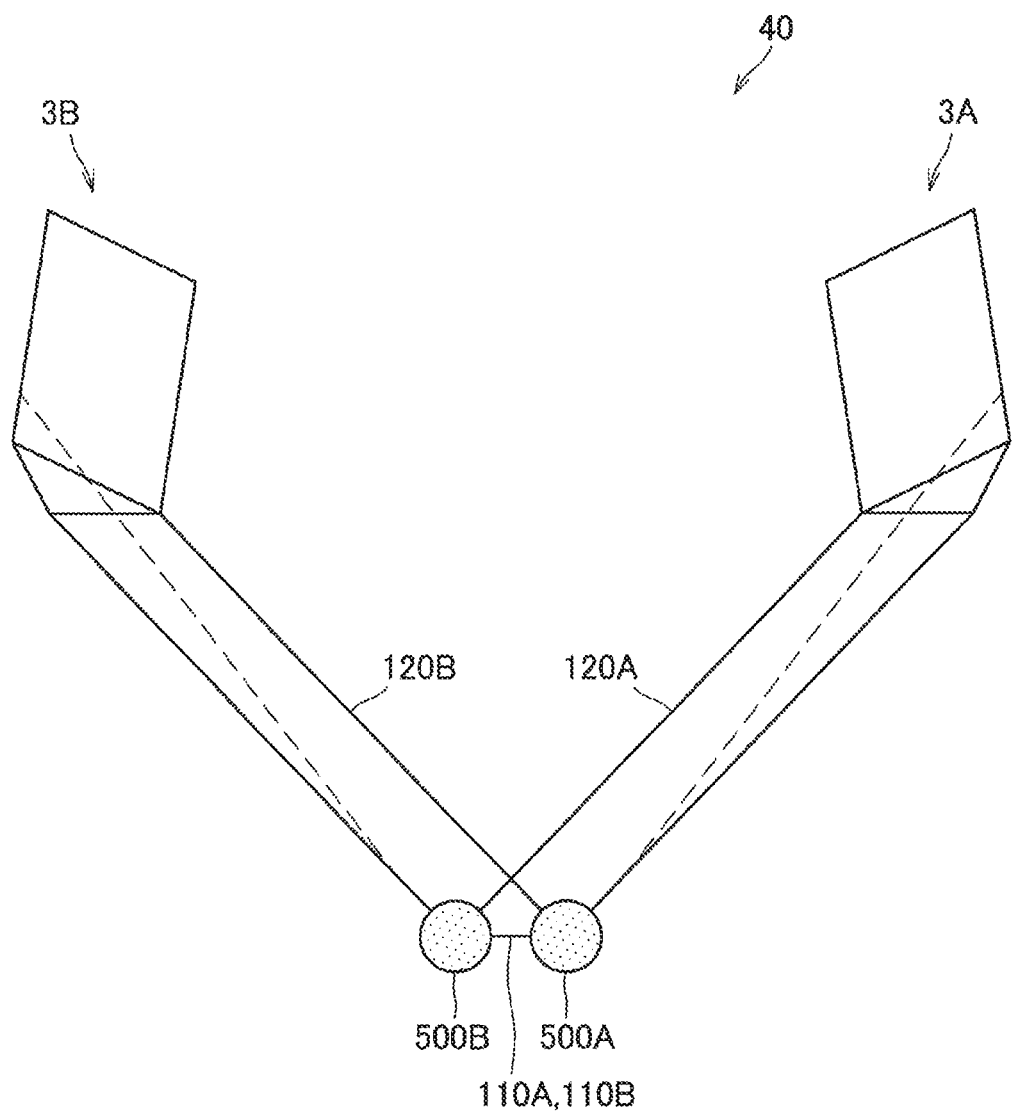
FIG. 9B is an explanatory diagram schematically illustrating a structure of a gripper mechanism according to the second modification.

Next, first and second modifications of the gripper mechanism 10 according to the second embodiment will be described with reference to FIGS. 9A and 9B. FIG. 9A is an explanatory diagram schematically illustrating an example of a structure of a gripper mechanism according to the first modification, and FIG. 9B is an explanatory diagram schematically illustrating another example of a structure of a gripper mechanism according to the second modification.

First Modification

As illustrated in FIG. 9A, a gripper mechanism 30 according to the first modification includes a first link mechanism 3A and a second link mechanism 3B. Here, the first link mechanism 3A and the second link mechanism 3B may share a portion of a joint or pivot. Specifically, one end of a side link 120A of the first link mechanism 3A and one end of a side link 120B of the second link mechanism 3B may be oscillatably joined by a joint to each other. Furthermore, one end of a fixed link 110A of the first link mechanism 3A and one end of a fixed link 110B of the second link mechanism 3B may be fixedly joined to each other.

With this arrangement, the first link mechanism 3A can oscillate on the basis of the fixed link 110A by the drive unit 500A provided at another end of the fixed link 110A. Furthermore, the second link mechanism 3B can oscillate on the basis of the fixed link 110B by a drive unit 500B provided at another end of the fixed link 110B. Therefore, the gripper mechanism 30 can perform gripping operation on the basis of the fixed link 110A and fixed link 110B having one ends joined to each other.

Second Modification

As illustrated in FIG. 9B, a gripper mechanism 40 according to the second modification includes the first link mechanism 3A and the second link mechanism 3B. Here, the first link mechanism 3A and the second link mechanism 3B may share a fixed link. Specifically, the fixed link 110A of the first link mechanism 3A and the fixed link 110B of the second link mechanism 3B may be shared, and the side links 120A, 120B of the first link mechanism 3A and the second link mechanism 3B, respectively, may be oscillatably joined by a joint to both ends of the shared fixed link. Furthermore, the drive unit 500B of the second link mechanism 3B may be provided at one end of the shared fixed link, and the drive unit 500A of the first link mechanism 3A may be provided at another end of the shared fixed link.

With this arrangement, the first link mechanism 3A can oscillate on the basis of the shared fixed link by the drive unit 500, and the second link mechanism 3B can oscillate on the basis of the shared fixed link by the drive unit 500B. Therefore, the gripper mechanism 40 can perform gripping operation on the basis of the fixed link shared by the first link mechanism 3A and the second link mechanism 3B.

4. Conclusion

As described above, with a link mechanism 1 according to the present embodiment, it is possible to cause a tip end part to make a substantially linear motion by using a simpler structure. Therefore, because the link mechanism 1 according to the present embodiment can reduce the number of parts, it is possible to further improve strength and reliability. Furthermore, because the link mechanism 1 according to the present embodiment is formed by a simpler structure, it is possible to achieve miniaturization or weight reduction more easily.

Furthermore, although the link mechanism 1 according to the present embodiment may be used for, for example, a gripper mechanism or a hand mechanism, the present technology is not limited to such an example. For example, the link mechanism 1 according to the present embodiment can be used for application in which the intermediate link 240 of the second parallel link mechanism 200 is required to make a translational motion without changing a height with respect to the fixed link 110 of the first parallel link mechanism 100. For example, the link mechanism 1 according to the present embodiment can also be used for a leg part of a chair or table, a stabilizer of a camera, or the like.

As described above, the preferred embodiments of the present disclosure have been described in detail with reference to the accompanying drawings, but the technical scope of the present disclosure is not limited to such examples. It is obvious that a person with an ordinary skill in a technological field of the present disclosure could conceive of various alterations or corrections within the scope of the technical ideas described in the appended claims, and it should be understood that such alterations or corrections will naturally belong to the technical scope of the present disclosure.

Furthermore, the effects described in the present specification are merely illustrative or exemplary and are not restrictive. That is, the technology according to the present disclosure can exhibit other effects obvious to those skilled in the art from the description of the present specification in addition to or in place of the above-described effects.

Note that the following configuration also belong to the technical scope of the present disclosure.

(1) A link mechanism comprising:
  a first parallel link mechanism having a fixed link and an intermediate link parallel to each other, and a pair of side links parallel to each other;
  a second parallel link mechanism having a fixed link and an intermediate link parallel to each other, and a pair of side links parallel to each other, in which the fixed link is connected to the intermediate link of the first parallel link mechanism;
  a fixed structure that is formed including the intermediate link of the first parallel link mechanism and the fixed link of the second parallel link mechanism; and
  a coupling link that couples one of the side links of the first parallel link mechanism and one of the side links of the second parallel link mechanism.

(2) The link mechanism according to (1), wherein the intermediate link of the second parallel link mechanism is provided so as to make a substantially linear motion when oscillated with the fixed link of the first parallel link mechanism fixed.

(3) The link mechanism according to (1) or (2), wherein the coupling link has a shape extending in one direction and is oscillatably joined to one of the side links of the first parallel link mechanism and one of the side links of the second parallel link mechanism.

(4) The link mechanism according to (3), wherein joining positions of the coupling link and each of one of the side links of the first parallel link mechanism and one of the second parallel link mechanism are set at least on a basis of lengths of each link of the first parallel link mechanism and the second parallel link mechanism, and a length of the coupling link.

(5) The link mechanism according to any one of (1) to (4), wherein
  there are provided a plurality of the coupling links, and
  the plurality of coupling links is provided so as to sandwich structural members that form the first parallel link mechanism and the second parallel link mechanism.

(6) The link mechanism according to any one of (1) to (5), wherein
  there are provided a plurality of the coupling links, and
  the plurality of coupling links is provided so as to be parallel to each other.

(7) The link mechanism according to any one of (1) to (6), wherein the fixed structure is a truss structure formed by a parallelogram shape and a diagonal line of the parallelogram shape.

(8) The link mechanism according to any one of (1) to (6), wherein the fixed structure is a truss structure formed by a triangle.

(9) The link mechanism according to any one of (1) to (8), wherein a drive unit capable of oscillating the fixed link of the first parallel link mechanism is provided at one end of the fixed link.

(10) The link mechanism according to any one of (1) to (9), wherein the coupling link formed by an elastic body capable of extension and contraction in an extending direction.

(11) The link mechanism according to (10), wherein the link mechanism further includes a sensor that measures an amount of deformation of the coupling link.

(12) The link mechanism according to any one of (1) to (11), wherein
  there is provided a plurality of the link mechanisms formed by the first parallel link mechanism, the second parallel link mechanism, the fixed structure, and the coupling link, and
  the plurality of link mechanisms is provided so as to be able to oscillate in a direction toward each other.

(13) The link mechanism according to (12), wherein the plurality of link mechanisms shares at least a portion of the fixed link of the first parallel link mechanism with each other.

(14) The link mechanism according to (12) or (13), wherein the plurality of link mechanisms is provided so as to be able to oscillate in conjunction with each other.

(15) The link mechanism according to any one of (12) to (14), wherein the plurality of link mechanisms is provided so as to be symmetric to each other.

REFERENCE SIGNS LIST

1 LINK MECHANISM
10 GRIPPER MECHANISM
100 FIRST PARALLEL LINK MECHANISM
110 FIXED LINK
120, 130 SIDE LINK
140 INTERMEDIATE LINK
200 SECOND PARALLEL LINK MECHANISM
210 FIXED LINK
220, 230 SIDE LINK
240 INTERMEDIATE LINK
300 FIXED STRUCTURE
320, 330 SIDE LINK
350, 360 CROSS LINK
400 COUPLING LINK
500 DRIVE UNIT

The invention claimed is:
1. A first link mechanism, comprising:
  a first parallel link mechanism that includes:
    a first fixed link,
    a first intermediate link parallel to the first fixed link,
    a first side link, and a second side link parallel to the first side link;
a second parallel link mechanism that includes:
a second fixed link,
a second intermediate link parallel to the second fixed link,
a third side link, and
a fourth side link parallel to the third side link,
wherein the second fixed link of the second parallel link mechanism is connected to the first intermediate link of the first parallel link mechanism;
a fixed structure that includes the first intermediate link of the first parallel link mechanism and the second fixed link of the second parallel link mechanism;
a first coupling link; and
a second coupling link parallel to the first coupling link, wherein each of the first coupling link and the second coupling link couples one of the first side link or the second side link of the first parallel link mechanism and one of the third side link or the fourth side link of the second parallel link mechanism.

2. The first link mechanism according to claim 1, wherein the second intermediate link of the second parallel link mechanism is configured to make a substantially linear motion based on oscillation of the second intermediate link with the first fixed link of the first parallel link mechanism.

3. The first link mechanism according to claim 1, wherein the first coupling link has a shape extending in one direction and is oscillatably joined to the one of the first side link or the second side link of the first parallel link mechanism and the one of the third side link or the fourth side link of the second parallel link mechanism.

4. The first link mechanism according to claim 3, wherein a first joining position of the first coupling link and the one of the first side link or the second side link of the first parallel link mechanism and a second joining position of the first coupling link and the one of the third side link or the fourth side link of the second parallel link mechanism are set based on lengths of each link of the first parallel link mechanism and the second parallel link mechanism, and a length of the first coupling link.

5. The first link mechanism according to claim 1, wherein the first coupling link and the second coupling link sandwich structural members that include the first parallel link mechanism and the second parallel link mechanism.

6. The first link mechanism according to claim 1, wherein the fixed structure is a truss structure that has a parallelogram shape and a diagonal line of the parallelogram shape.

7. The first link mechanism according to claim 1, wherein the fixed structure is a truss structure that has a triangular shape.

8. The first link mechanism according to claim 1, further comprising a drive unit configured to oscillate the first fixed link of the first parallel link mechanism, wherein the drive unit at one end of the first fixed link.

9. The first link mechanism according to claim 1, wherein the first coupling link includes an elastic body configured to extend and contract in an extending direction.

10. The first link mechanism according to claim 9, further comprising a sensor configured to measure an amount of deformation of the first coupling link.

11. The first link mechanism according to claim 1, wherein
a second link mechanism includes the first parallel link mechanism, the second parallel link mechanism, the fixed structure, and the first coupling link, and
the first link mechanism is configured to oscillate in a direction toward the second link mechanism.

12. The first link mechanism according to claim 11, wherein the first link mechanism shares at least a portion of the first fixed link of the first parallel link mechanism with the second link mechanism.

13. The first link mechanism according to claim 11, wherein the first link mechanism is further configured to oscillate in conjunction with the second link mechanism.

14. The first link mechanism according to claim 11, wherein the first link mechanism is symmetric to the second link mechanism.

15. A link mechanism, comprising:
a first parallel link mechanism that includes:
a first fixed link,
a first intermediate link parallel to the first fixed link,
a first side link, and
a second side link parallel to the first side link;
a second parallel link mechanism that includes:
a second fixed link,
a second intermediate link parallel to the second fixed link,
a third side link, and
a fourth side link parallel to the third side link,
wherein the second fixed link of the second parallel link mechanism is connected to the first intermediate link of the first parallel link mechanism;
a fixed structure that includes the first intermediate link of the first parallel link mechanism and the second fixed link of the second parallel link mechanism;
a first coupling link; and
a second coupling, wherein
each of the first coupling link and the second coupling link couples one of the first side link or the second side link of the first parallel link mechanism and one of the third side link or the fourth side link of the second parallel link mechanism, and
the first coupling link and the second coupling link sandwich structural members that include the first parallel link mechanism and the second parallel link mechanism.

* * * * *